US005627765A

United States Patent [19]
Robotham et al.

[11] Patent Number: 5,627,765
[45] Date of Patent: May 6, 1997

[54] METHOD AND APPARATUS FOR COMPRESSING AND ANALYZING VIDEO AND FOR CREATING A REFERENCE VIDEO

[75] Inventors: John Robotham, Belmont; Philip Moorby, Boxford; Paul DiLascia, Reading, all of Mass.; Philip Mason, Nashua, N.H.

[73] Assignee: Avid Technology, Inc., Tewksbury, Mass.

[21] Appl. No.: 279,939

[22] Filed: Jul. 25, 1994

[51] Int. Cl.⁶ .................................................. G06F 17/00
[52] U.S. Cl. ............................................................ 364/514 R
[58] Field of Search ..................... 364/514 R, 514 A, 364/715.02; 348/409, 420, 412, 400, 386, 387; 345/202

[56] References Cited

U.S. PATENT DOCUMENTS

| | | | |
|---|---|---|---|
| 4,591,908 | 5/1986 | Hirano | 348/396 |
| 4,704,628 | 11/1987 | Chen et al. | 348/386 |
| 4,823,184 | 4/1989 | Belmares-Sarabia et al. | 358/27 |
| 4,897,717 | 1/1990 | Hamilton et al. | 364/514 R |
| 4,914,508 | 4/1990 | Music et al. | 348/420 |
| 5,072,296 | 12/1991 | Lim | 348/409 |
| 5,083,860 | 1/1992 | Miyatake et al. | |
| 5,099,322 | 3/1992 | Gove | |
| 5,191,419 | 3/1993 | Wischermann | 358/167 |
| 5,300,949 | 4/1994 | Rodriguez et al. | 345/202 |
| 5,353,061 | 10/1994 | Rodriguez et al. | 348/409 |
| 5,388,197 | 2/1995 | Rayner | 395/154 |
| 5,408,542 | 4/1995 | Calahan | 348/420 |
| 5,465,118 | 11/1995 | Hancock et al. | 348/396 |

FOREIGN PATENT DOCUMENTS

| | | |
|---|---|---|
| 0555873 | 8/1993 | European Pat. Off. |
| 0588653 | 3/1994 | European Pat. Off. |
| 2252471 | 8/1992 | United Kingdom |
| WO9411995 | 5/1994 | WIPO |

OTHER PUBLICATIONS

"Automatic Adaptive Coding of Moving Pictures", IBM Technical Disclosure Bulletin, 36(9a):609–610 (Sep. 1993).

Y. Kato et al., "A coding control algorithm for motion picture coding accomplishing optimal assignment of coding distortion to time and space domains", Electronics and Communications in Japan–Part I, 72(9): 63–73 (Sep. 1989).

K. Watanabe et al., "A study on transmission of low bit-rate coded video over radio links", IEEE Vehicular Technology Conference, 2:1025–1029 (Jun. 8, 1994).

*Primary Examiner*—Ellis B. Ramirez
*Attorney, Agent, or Firm*—Wolf, Greenfield & Sacks, P.C.

[57] ABSTRACT

The method and apparatus for generating a reference video sequence of images includes performing a grid analysis of each of the frames of the video sequence, assigning a color value to that frame, calculating the difference in total color value between frames in the video sequence, establishing a threshold value for transitions and dropping those frames whose transitions from frame to frame are below the threshold value. The reference video analysis may be performed on a single user system or over a network system including a number of workstations.

17 Claims, 3 Drawing Sheets

METHOD AND APPARATUS FOR COMPRESSING AND ANALYZING VIDEO AND FOR CREATING A REFERENCE VIDEO

FIELD OF THE INVENTION

The invention relates generally to systems and methods for editing and composing audiovisual and motion picture material and more particularly to providing users easy analysis of a video sequence via selective compression of digital video.

In video applications, analog video is digitized and stored on appropriate magnetic or electro-optic media in a compressed form for later retrieval for purposes of editing. Digital video by its nature typically requires large amounts of storage. The amount of storage required is a function of the image size, the number of frames per second, color resolution and the compression algorithm chosen.

While there have been many advances in the density of storage of information on present day media and advances in the compression of video data via various algorithms, nevertheless, storage requirements on the order of 10 kilobytes per frame remain typical even today. Thus, even with modern storage techniques and advanced compression algorithms, the computer system still requires a very large disk capacity in order to manipulate large amounts of video. As digital video applications become available to users of PCs, PCs are required to be equipped with higher and higher capacity disks in order to run video applications such as tutorials or other full length productions. As the competition has increased in an effort to squeeze more and more video onto existing storage media, a number of competing compression schemes have evolved. Each of these schemes use different compression algorithms. They all work on the basic principle of preserving each video frame and compressing every video frame more or less efficiently according to the algorithm chosen.

The prior art schemes, although using different algorithms, still work on the basic principle of "lifeless" compressed video such that each and every frame can be decompressed as required. For example, in the MPEG compression standard a video stream is compressed by storing only an encoded version of calculated differences between successive video frames. This compression standard is computationally intensive. In a JPEG compression scheme, compression is based on a discrete cosine transform of the image and run length encoding.

SUMMARY OF THE INVENTION

In general, the present invention pertains to a method and apparatus for analyzing the content of a frame of video and for performing compression or other activity based on this analysis. For example, a method of compressing video based on this analysis drastically reduces the amount of storage required by selectively deleting one or more of the video frames, the final assembly of frames without deleted frames being termed a "reference video". Storage space is not wasted for images which are substantially the same as the images in a previous frame or frames. This analysis can also be used to provide for intelligent and dynamic elimination of frames from video information being transmitted, for example, over a computer network. It may also be used for scene detection.

The inventors have observed that in many video applications not all the frames are important if the viewer cares only about the information content as opposed to the aesthetic value of the video pictures. As an example, if the video application is a newscast with the camera focused upon the upper body of the newscaster in which there is almost no body movement and only movement of the lips of the newscaster, compressing each of the many frames which form a sequence of the newscast wastes space in view of the minimal movement and thus the minimal difference between each of the frames. If all that is required in an educational or tutorial program is that the speaker is a newscaster and it does not matter much whether the newscaster's lips are seen to move all of 30 seconds or a minute or longer, video sequences may be eliminated without losing the informational content of the video. Thus, all frames other than a first frame and perhaps a last frame may be deleted and the entire sequence may be replaced by a single frame that is played for the full period of the audio. The audio portion corresponding to the video segment is either preserved in full or may be compressed using known techniques.

For example, if an entire sequence is 30 seconds and given a typical video speed of 30 frames per second, 30 seconds of video amounts to 900 frames so that 898 or 899 out of the 900 frames can be dropped. This is a tremendous savings of storage space.

In the present invention a reference video is made by selectively deleting frames when effectively "nothing much is happening" in the video, that is, when the amount of change from frame to frame during a given segment of time does not differ sufficiently to warrant compression of each and every video frame. Thus, in the present invention, a "reference" of the video segment is preserved and continuously replayed while the audio content, if any, is played in full. While this methodology may result in the loss of some smoothness (in the example the newscaster's lips would not be moving) nevertheless in many applications it is more desirable to conserve storage space at the price of a fully compressed sequence in which the newscaster's lips are seen to move. This method is also useful for reducing an amount of video information transmitted over a computer network, particularly where bandwidth may be limited.

Thus, the present invention relates to a video analysis system which decides when "nothing much is happening", that is, when a value indicative of the amount of change or transition from one frame to another is below a minimal change value or threshold set by the user. When the amount of change between a first and a subsequent second frame is below the threshold, the subsequent frame is simply deleted, for compression, or not transmitted in a computer network. The results of analysis may also be used for scene detection. If, however, the amount of change exceeds the threshold, then that frame will be preserved and may even be compressed using any known compression algorithm.

It is also an object of the invention to provide a system which analyzes content of a video frame.

It is also an object of the present invention to generate and retain information regarding frame difference to use as a basis for scene-identification in a video program.

Thus, it is an object of the present invention to provide a novel compression methodology in which selective frames are dropped if the change value of the frame is below a certain threshold.

It is also an object of the present invention to drastically reduce the amount of storage space required compared to prior art compression algorithms by selectively deleting certain frames for purposes of storage.

It is also an object of the present invention to provide a system and method for compression which facilitates the use of video techniques on PCs even without large capacity storage media.

It is yet a further object of the present invention to provide a compression algorithm which can be selectively set to certain thresholds to allow for selectively storing different levels of detail of a video sequence on a storage media.

It is still further an object of the present invention to provide a method and apparatus for increasing the throughpart of video images or a network system.

BRIEF DESCRIPTION OF THE DRAWINGS

For a better understanding of the present invention together with other and further objects, advantages and capabilities thereof, reference is made to the accompanying drawings which are incorporated herein by reference and in which.

DESCRIPTION OF THE PREFERRED EMBODIMENT

Figure 1:
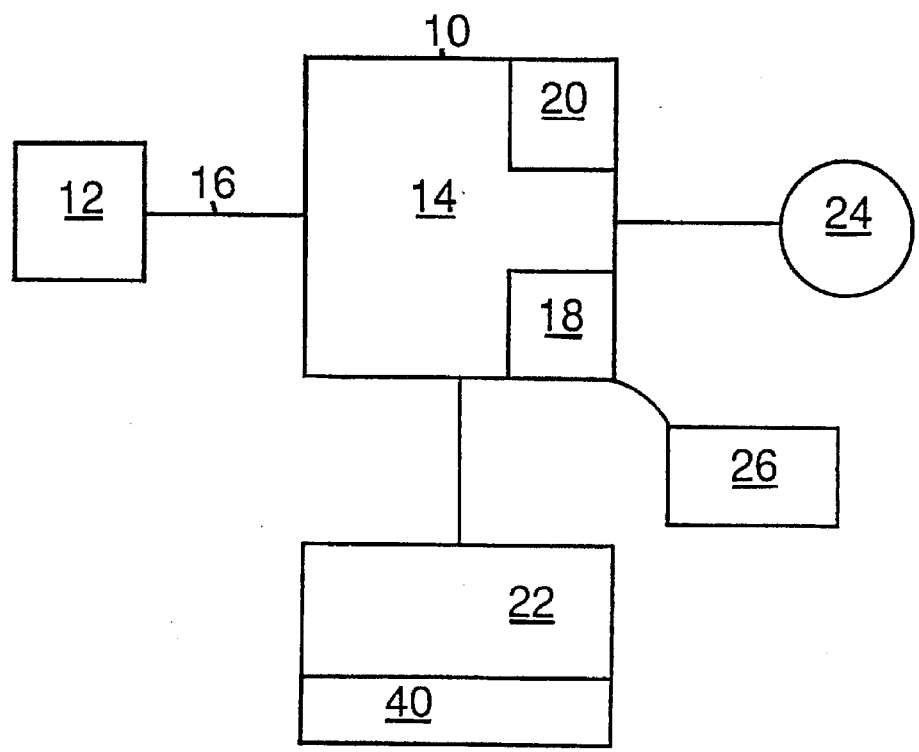
FIG. 1 is a block diagram of a video picture composing system according to the present invention.

Referring now to FIG. 1, an exemplary video picture composition system 10 according to the invention includes a source 12 of video information. This information may be information which is contained on magnetic tape and constitutes the entire amount of frames in a given video sequence. It may also be any other type of storage media which contains video information, such as video disks, CD-ROM information or may even be a camera which is capturing video images "on the fly" or, input over a computer network of digital video information. The information contained within the block 12 thus is the plurality of frames comprising any given video sequence or video sequences. A computing system which may be, for example, an Apple Macintosh or IBM-type personal computer (PC) 14, receives the full sequence of frames from the source 12. Many other computers may be used; the invention is not limited to these types of computers. A data path 16 links the storage medium to the input medium 12 to the computer 14. Contained within the computer 14 is a program 18 which contains a media storage and playback of video and audio information system such as that shown in Peters et al., "Video and Audio Transmission System and Method", U.S. Pat. No. 5,045,940 issued Sep. 3, 1991, the content of which is herein incorporated by reference. The computer may also include a second program 20 which incorporates the reference video system and method of the present invention, to be described below. Furthermore, the computer contains a display interface 22, shown in greater detail in FIG. 3, which displays the results of the reference video compressed according to the present invention. Furthermore, the computer system 14 has associated with it a high speed, high capacity internal or external magnetic hard disk drive 24 which may contain, among other things, the video sequence compressed according to the present invention, i.e., the reference video. The computer may be connected directly to the drive 24 or receive the reference video over a network. As stated above, the present invention will analyze each video frame.

Figure 2:
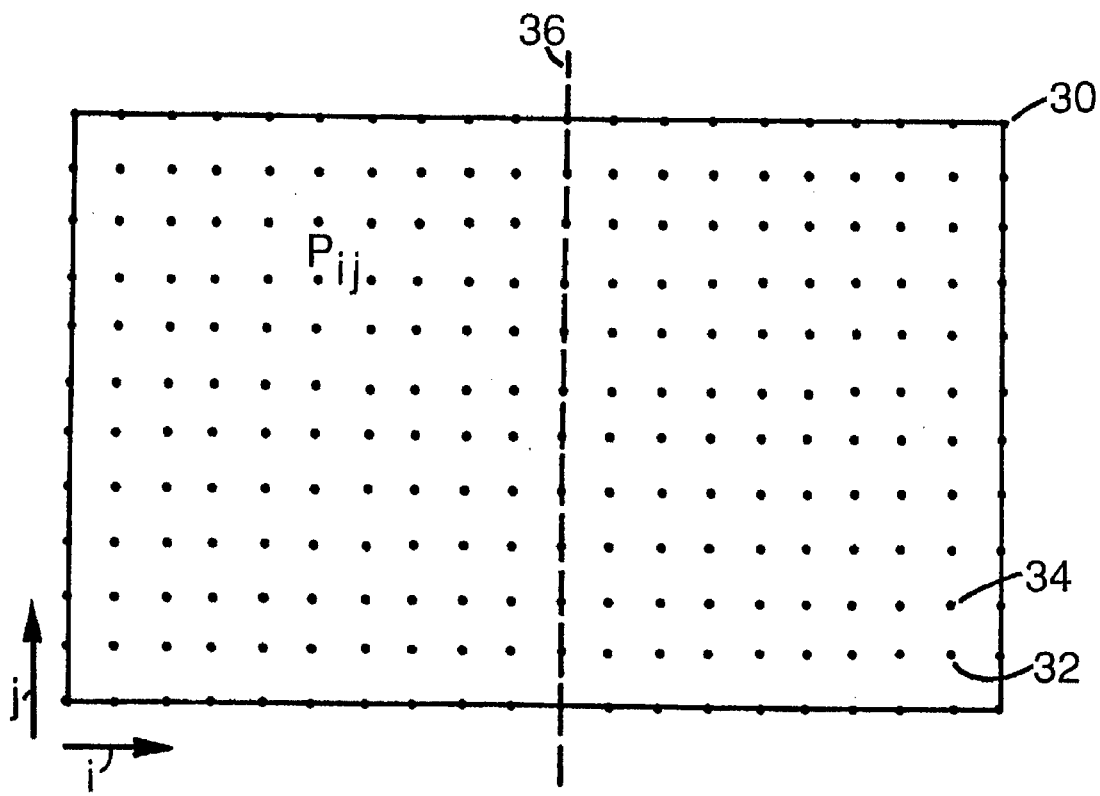
FIG. 2 is a representation of the video frame grid which is analyzed.

Turning now to FIG. 2, FIG. 2 shows a grid that is selected to be 20 pixels wide and 12 pixels high. As shown in FIG. 2, a video frame 30 is shown as a grid of 20 pixels wide (32) and 12 pixels (34) high. While the grid of 20×12 pixels has been illustrated, naturally the invention should not be read to be limited to this particular size grid. The grid size is preferably a function of the dimensions of the image or the frame size. While the inventors have found that the 20×12 pixel grid may be sufficient for certain types of video, any number of pixels in a grid may be chosen depending upon the amount of detail which is desired and upon the particular content of the information which is contained in each of the frames. Thus, the grid may be changed as desired to alter the granularity or resolution of the analysis by the invention of the present system. In operation, the program 20 analyzes each frame 30 by comparing the color values (whether RGB (red, green and blue), CMYK (cyan, magenta, yellow and black) or YUV (luminance and chrominance) color encoding schemes) for each pixel in the grid with the corresponding pixel in the previous frame. In order to maintain consistency, the grid patterns are maintained the same for a particular video sequence which is to be compressed. Once the color values of each pixel in the 20×12 grid has been compared with the corresponding pixel in the previous frame, a total color count (TCC) per frame is computed by the computer 14. The TCC is the sum of all its color values for all of the pixels in the grid. The algorithm which calculates TCC, given color values in RGB format, is as follows:

$$TCC = \Sigma_{ij} (Red(P_{ij}) + Green(P_{ij}) + Blue(P_{ij}))$$

As can be seen by the above equation for each pixel $P_{ij}$, the red, green and blue values are summed for all the pixels in the frame. The sum TCC is an integer (typically of 32 or 64 bits) which is then computed for the next succeeding frame in the video sequence and the absolute value of the difference is calculated. If the difference of TCC from one frame to the next is greater than a certain number called the threshold, then the second frame is called a transition and is kept. However, if the difference in the value TCC from one frame to the next is less than or equal to the number defined as the threshold, then that succeeding frame is identified as containing an insignificant change and may be dropped or deleted. Thus, the larger the difference in TCC from one frame to a succeeding frame, the greater the transition from one frame to the next. The threshold value default is set to 2000, which has been found by the inventors empirically to yield good results in determining transitions for video material using a 20×12 grid. However, the threshold value default of 2000 may be adjusted by the user as desired. This threshold may also be dynamically adjusted to allow for even better choices for frame deletion in varied material. By choosing a higher number, for example, the user can cause more frames to be dropped. This would result in a smaller amount of information to be stored but the corresponding video would naturally appear more choppy.

By choosing a lower threshold value default, the user can cause fewer frames to be dropped. This would result, naturally, in a larger amount of information to be stored but the corresponding video would appear smoother. Once all the frames of a selected video sequence have been analyzed according to the selected video threshold value, the results are stored in a data structure so that the program can instantly determine whether any particular frame is a transition or not without performing the calculations again. This data may be stored in or near the video file itself. As analysis progresses, each frame's TCC is stored in an array. Also, a visualization bit map is stored in or near the video file and is constructed as the video is analyzed. Thus, for each of the frames a transition value is associated with each frame and stored to be used at a later time in adjusting the resulting video, as will be described below.

An important refinement of the present invention is that the algorithm may compare each frame's TCC, not to the previous frame's total TCC, but to the previous transition frame's TCC. The transition frame is a previous frame which has been kept because it has exceeded the selected threshold value. The purpose of comparing each frame's total color count to the previous transition frame's TCC is to correctly analyze certain video sequences such as a panning shot. In a panning shot each frame differs only a little from the preceding frame while the overall effect over a number of frames adds to a significant change over several frames. By utilizing the last transition frame as a basis for comparison, the computer insures that it will keep a frame when the accumulated difference exceeds the threshold set.

Once the computer has analyzed the frames in a video sequence in accordance with a selected threshold value in a set grid pattern, the results are stored in a memory device which may either be a dynamic type of memory contained within the computer 14 or on the disk 24. The user may then play back the reference video to see how it appears. If the resulting video sequence appears too choppy or unnecessarily smooth, the user may manually add or drop frames to his liking by adjusting the threshold as described above. Since the system has kept a record of the TCC of each frame, this manual addition or detection of frames may be accomplished without recalculating for each video frame its TCC.

When the user is satisfied with the content of the presentation of the video sequence, the user may cause the program to issue a "Save Reference Video" or other command, whereupon the program copies each frame in the original source file to a new reference video file, in the process eliminating the dropped or deleted frames as it goes. The resulting reference video is an exact copy of the original video sequence in which a number of frames have been dropped. The user may also wish to consider only the analysis information which can be stored without writing of the reference video.

It has been found that this reference video file is usually much smaller than the original although the compression obtained depends upon the video content. It has been found that typically the compression range is from 10:1 to 100:1. This is, of course, in addition to whatever normal compression may be used on the frames themselves. The reference video file can be written to a separate disk file or another file, as desired. In normal circumstances, the reference video file in any appropriate video file format, such as an Audio-Video Interleaved (AVI) file unless that file resides on a read-only device, such as a CD-ROM or to a write-protected file. In this case, it is written to a separate file. It can be stored anywhere so long as it is associated with the video file. The information in the reference video file includes the new analysis information, and may include a transition bit map (which frames have been determined to be transition frames), a visualization bit map, to be discussed below, and other related information (for example, if the analysis was interrupted, the number of the last frame analyzed).

As a result of the above analysis, frames may be dropped (e.g., during storage or transmission) only when it is appropriate that such frames be dropped according to the content of the video file, size of the grid and whether the frames exceed the threshold value from one previous transition frame's TCC to the next. Thus, if the video under review contains a large amount of transitions, no or almost no frames are dropped and the user sees the full original sequence of frames in a video sequence. However, if there is little or no movement or transition of scenes, the reference video drops many extraneous frames.

In the analysis and composing of a particular video sequence, it is useful for the user to have an overall snapshot picture of the transitions during a full video sequence. This is accomplished through what the inventors term "video visualization." Video visualization is a way of viewing a portion of the entire video sequence at a glance on the screen 22 of the computer system. For example, a video clip may start with a scene A then cut to scene B then to scene C, then back to A and back to C so that the overall video sequence structure is ABCAC. Previously, there was no way to see this structure without viewing the entire video sequentially. Video visualization provides a means to view the overall structure without viewing the entire video. This is accomplished during the analysis phase described above as the program examines the 12 by 20 grid for each frame. While doing so, it also builds a bit map which is called the "visualization bit map". This bit map is 1 pixel wide (of the 20 pixels in our example) and 12 pixels high (for the grid described above) for each frame of the video. Thus, if the video sequence contains 500 frames, the bit map is 500 pixels wide and 12 pixels high. Obviously, the bit map is usually chosen to be as many pixels high as the grid used to generate the transition analysis. If the grid is 10 pixels high, then the visualization bit map will be 10 pixels high and the visualization bit map in this example would be 10 high by 500 wide. As each frame is analyzed for transitions in its grid, the center vertical slice of the grid shown as 36 in FIG. 2 is copied to a visualization bit map file. Thus, the resulting bit map for the entire video sequence contains a very small sample (i.e., one pixel wide) from every frame in the video sequence. Of course, the user may select the center vertical slice of the grid to have any reasonable width not greater than the frame width such as 2 bits. Thus, the resulting bit map contains a very small sample from every frame in the video sequence. While much of the information is lost, enough is retained to get an overall picture of the entire sequence enough to create a scene of large motions, color changes and most scene transitions and in general to discern the overall structure discussed with respect to the ABCAC example discussed above. While it is preferred to utilize the center slice of each of the frames, it is obvious that any other slice may be chosen within the frame such as the leading or the trailing edge of the frame or any slice between the leading and trailing edges, but preferably any even diagonal slice.

Figure 3:
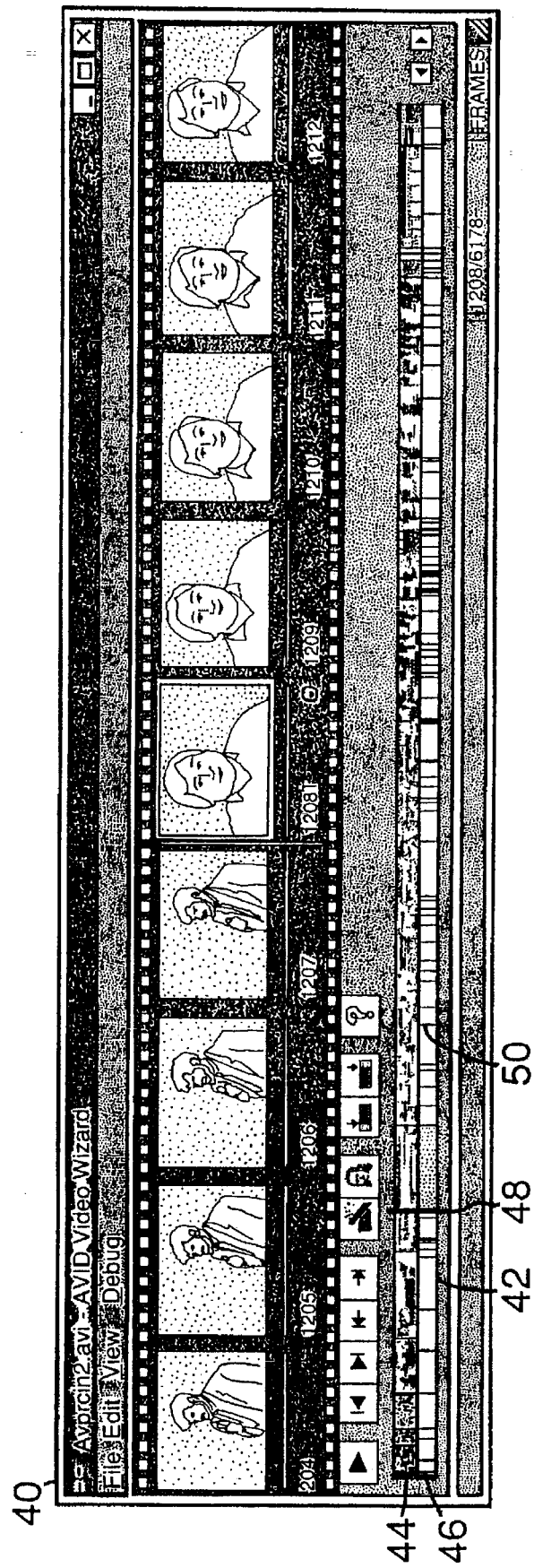
FIG. 3 is a visualization bit map for a given video segment.

FIG. 3 illustrates a visualization bit map 40 on the screen 22 of the computer 14. As seen in FIG. 3, the visualization bit map 42 is displayed along the bottom of the screen. The visualization bit map is comprised of two components, an upper portion 44 containing the visualization bit map containing the slice from each of the frames in the video sequence and a lower half timeline 46 which has marked on it scene transitions, to be discussed below. The lower portion 46 forms half of a time line which the time line has a vertical slider 48 that the user can move along the visualization bit map 44 using a mouse or other device 26 shown in FIG. 1 in order to move back and forth within the visualization bit map.

With the background for the timeline it makes it easier for the user to navigate through the video since he or she can see the entire sequence of the video and thus see "where he or she is going". The means for determining and displaying the slide transitions 46 on the scale 44 will now be described.

It is useful in a transition analysis to determine and display the scene transitions within the given video sequence. Thus, when the camera cuts from a close-up of a head to a shot of a beach or from a commercial to the main program, the means which performed the analysis of the grid on each of the frames is utilized. The only difference is that a higher threshold is used so that only strong transitions count as scenes. Thus, if the reference video threshold is set as described above at 2000, the user might set the scene threshold at 4000 (which is a dimensionless user-selected arbitrary number derived from the TCC). Obviously, the level of the scene threshold, like the reference video threshold, may be determined by the user after some experimentation and is dependent upon the particular video sequence which is being displayed. In addition, the user may set the minimum length for the scenes. For example, the user might want to find and have displayed all scenes which are at least 3 seconds long. When the user commands a system to find the scenes, the same transition information obtained during the grid analysis is used to find all transitions at least 3 seconds long that exceed the set preestablished scene threshold. Thus, if any segments are shorter than the requested minimum duration, they are merged and do not appear as screen thresholds.

FIG. 3 shows the resulting scene transitions indicated by thin vertical lines 50 on the timeline 46. Thus, the overall information presented to the user in FIG. 3 is a visualization bit map of the activity during an entire video sequence as well as any scene transactions within that video sequence. While the video visualization bit map 44 shows the entire number of frames in a video sequence, the user may desire to select a particular subsequence of the video sequence to work with. For example, frames 200 to 300 of a 500 frame sequence. When selecting a subset of the video sequence, a new visualization bit map and time line will appear similar to the display 44 of FIG. 3 either below or above the original video visualization bit map 42. Further visualization time lines for subsequences may also be accommodated in the display 42.

Figure 4:
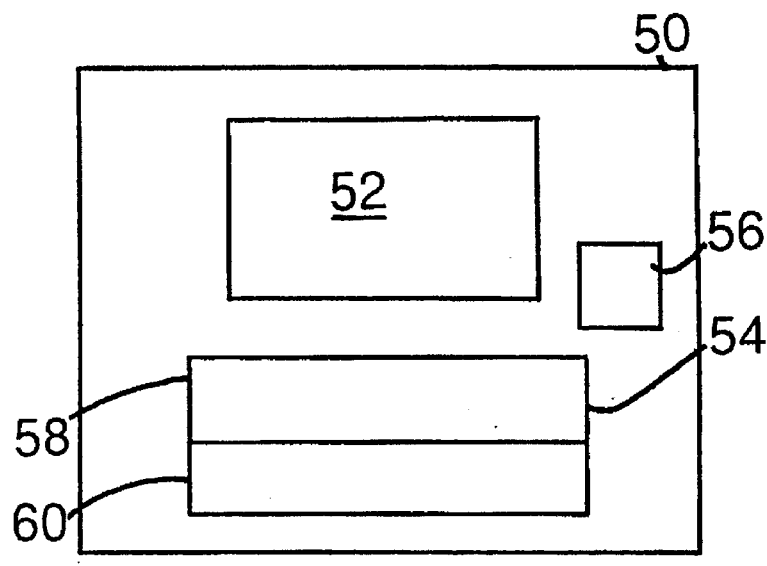
FIG. 4 illustrates a display of video sequence images in accordance with the present invention.

Another feature of the present invention is the ability in certain circumstances should the user desire to conserve storage space to provide a viewing of a video sequence by viewing in full image only the reference video as compressed in accordance with the analysis described above as well as a full motion video of a reduced size. For example, as shown in FIG. 4, a display screen 50 contains a number of images. Display 52 is the full size display of the reference video as described above. Display 54 is the visualization bit map and time line display described above and display 56 is a miniaturized display which may be of any small size, such as 60 by 80 pixels, of the full motion of the video sequence. Providing a miniaturized or reduced size version of the full video of only, for example 60 by 80 pixels in size, considerably reduces the amount of storage space required for that particular video sequence. Thus, the user, once he or she has had the program 20 perform an analysis of the video sequence and produced a reference video, may view the entire video sequence by viewing the screen 50 as shown in FIG. 4. The user will observe a visualization bit map 58' and a time line 60' as the video sequence moves from frame to frame. On screen 52, the reference video will be displayed in which all or partial movement will be eliminated. However, if the user wishes to see the full motion of the video sequence, he or she can look at the display 56 which shows the miniature or full display video. The user may obtain a great deal of useful information about the content of the video sequence at a large savings in storage capacity.

Figure 5:
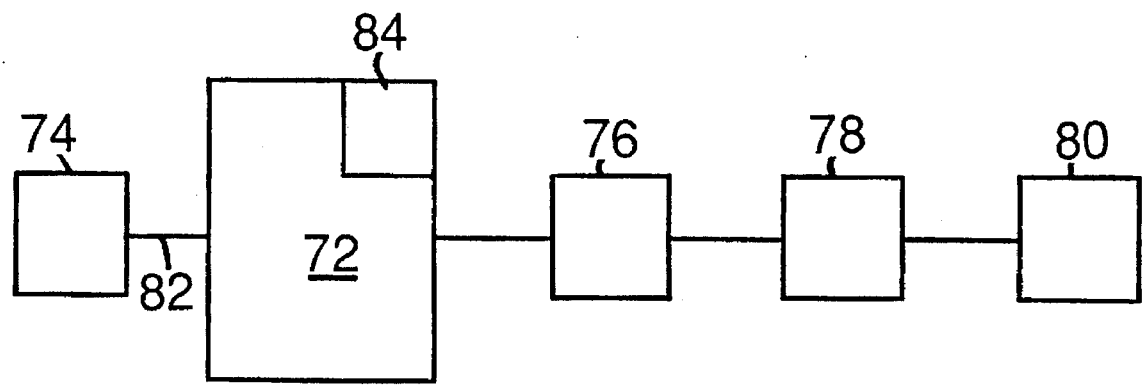
FIG. 5 illustrates a network system in accordance with the present invention.

An additional use for the analysis provided for the reference video is in a network system for video systems. As shown in FIG. 5, a network system is shown in a block diagram. FIG. 5 illustrates a network system 70 which comprises a central file server 72 and a number of workstations 74, 76, 78 and 80 connected through a suitable network 82 which may be of a Ethernet-type or other type network which is well-known in the art. The network file server 72 contains the actual video files which may be desired to be used by the user at one of the workstations 74, 76, 78, 80. While the user may be accessing the video file from the file server 72, other workstations on the network similarly may be attempting to access other video files contained on the network file server 72. As "traffic" builds up on the network, delays may occur as various workstations "contend" for access to the video files contained on the file server 72. While networks themselves such as Ethernet include protocols which attempt to reduce the number of interferences between requesting workstations, nevertheless on a crowded network delays may occur.

Since video information typically consumes a great deal of network bandwidth, the possibility of contentions on a crowded video image network increase as compared to other data communication. The network system 70 of FIG. 5 may reduce contentions and increase throughput on the network by implementing a modified version of the reference video analysis described above with respect to the embodiments of FIGS. 1-4. Thus, the network file server 72 contains a program 84 which is similar to the program 20 described with respect to the embodiment of FIGS. 1-4. Program 84 will similarly perform a transition analysis of each of the frames, set a threshold then determine whether each succeeding frame is considered a transition. In the single user form of the invention described in FIGS. 1-4, the threshold value may be set by the user for a particular video sequence, and it is generally intended that the threshold value will remain constant during the analysis described above. However, for purposes of utilizing the reference video analysis in a network environment, while a constant threshold value may be utilized, it is preferred that the threshold value be variable and changed dynamically as required. If a user at workstation 74 requests a video file which is housed in the network file server 72 for his or her use in editing, composing or simple viewing, and the network file server is at that time busy serving other workstations, the file server will send the user at workstation 74 the reference video rather than the full length video because the program 84 contains the analysis of the video sequence which the user at workstation 74 requires. If the traffic on the network is not busy, however, the full length video sequence would be sent to the user at workstation 74.

However, as described above, the reference video may be dynamic in form rather than static by applying a dynamic variable threshold value. Since the program 84 has retained an analysis of each of the frames of the video sequence (and thus a measure of the transition value from frame to frame) as traffic in the network increases, it becomes impractical or is too time consuming to send full length video to a user at a workstation. Since the transition analysis information provides a number indicating the strength of the transition from each frame to the next, a prioritization of frames in the video sequence already exists. Thus, as the network output degrades due to multiple contentions, the least important, that is, the frames with the least amount of transition would be first dropped and the remaining frames sent to the user at workstation 74. In effect, it would appear that the threshold, described above as being static, would become dynamic and would raise or lower depending upon the traffic in the network. Effectively, the busier the network the higher the threshold. If the network has little traffic, the threshold would appear to drop and the entire video sequence may be transmitted at full speed to the user without dropping any frames. If the network becomes busier, the system drops video frames beginning with those with the weakest transition values first and then as traffic increases video frames with stronger transition values will be dropped. Obviously, there is a level at which the user may find the images of the video sequence too choppy for his or her use and may issue a command to the file server simply to delay sending any video image data until such time as the full image video data may be transmitted. However, for some purposes the dynamic reference video sequence of images may be sufficient for the user's purposes.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for compressing a sequence of a plurality of video frames on a computer system, comprising the steps of:

analyzing each of the frames to determine a value for a selected characteristic of each frame;

assigning a characteristic value to each frame dependent on the analysis of the selected characteristic;

establishing a threshold level related to a characteristic value;

comparing the characteristic value of succeeding frames to preceding frames;

deleting from the sequence those frames whose characteristic value is less than the threshold value;

whereby the plurality of video frames are compressed into a video sequence the number of whose frames is reduced in number and;

displaying the compressed video sequence.

2. The method of claim 1 wherein the step of analyzing each frame includes the step of establishing a grid pattern for each frame, the grid pattern corresponding to a selected number of pixels on each frame, the step of analyzing further including the calculation of the characteristic value at each pixel on the grid.

3. The method of claim 2, wherein the characteristic value is the color value for each pixel.

4. The method of claim 3, wherein an overall characteristic value for each frame is calculated by the further step of summing the individual color values at each pixel.

5. The method of claim 4, wherein the summing step is performed in accordance with the formula:

$$TCC = \Sigma Sij \; Red(Pij) + Green(Pij) + Blue(Pij)$$

where TCC represents the Total Color Value of the frame;
where P represents a pixel located in frame;
where Pij represents the value of the pixel located at the ith row and the jth vertical column in the grid of pixels;
where Red, Green and Blue represent the color values for the three colors red, green and blue of the pixel in the ith row and jth column.

6. The method of claim 2 wherein the selected characteristic of each frame is the color value of each pixel in the grid.

7. The method of claim 6 further comprising the step of determining an overall color value for each frame is calculated by the further step of summing the individual color values at each pixel.

8. The method of claim 7 wherein the summing step is performed in accordance with the formula:

$$TCC = Sij \; Red(Pij) + Green(Pij) + Blue(Pij)$$

where TCC represents the Total Color Value of the frame;
where P represents a pixel located in frame;
where Pij represents the value of the pixel located at the ith row and the jth vertical column in the grid of pixels;
where Red, Green and Blue represent the color values for the three colors red, green and blue of the pixel in the ith row and jth column.

9. The method of claim 8 wherein the step of establishing a threshold level related to the characteristic value comprises the step of determining a value related to TCC.

10. The method of claim 1 further comprising the step of deleting frames of the video sequence whose TCC is less than the value established in the step of establishing a threshold value and retaining those frames of the video sequence which equal or exceed the threshold level TCC.

11. A method of visualizing for a user the informational content of a sequence of video frames in a computer system, the computer system including a display screen for displaying the video frames, comprising the steps of:

establishing a grid pattern for each video frame, the grid pattern corresponding to a selected number of pixels on each frame, the step of analyzing further including the calculation of the characteristic value at each pixel on the grid, wherein the grid is formed of pixels in i rows and j columns;

selecting a slice of each frame in the video sequence which is i rows wide and j columns high, wherein i and j are less than the total number of i rows and j columns of the frame;

arranging each slice of each frame in accordance with the sequence of video frames; and;

displaying the arranged slices of video frames on the display screen.

12. The method of claim 11, further comprising selecting a slice which is 1 pixels wide and j columns high.

13. The method of claim 11, further comprising the step of selecting a slice which is a center slice of the i rows.

14. The method of claim 11 wherein the display screen includes a display of a timeline representing the time duration of the video sequence, the timeline being displayed in close proximity to the arranged slices of the video frames, the timeline further comprising a marker displayed on the timeline to be selectively moved along the timeline, whereby the marker may be moved along the timeline, enabling the user to associate a particular time in the timeline with a particular video frame represented by a video frame slice.

15. A method for dividing a sequence of a plurality of video frames on a computer system into scenes, the computer system including a display screen for displaying indicia of a change of scene along a longitudinally-disposed portion of the display screen, comprising the steps of:

analyzing each of the frames to determine a value for a selected characteristic of each frame;

assigning a characteristic value to each frame dependent on the analysis of the selected characteristic;

establishing a threshold level related to a change of scene;

comparing the characteristic value of succeeding frames to preceding frames;

indicating a change of scene when the characteristic value exceeds the threshold level;

displaying the indicia of scene change along the longitudinally-disposed portion of the display screen for each a change of scene;

whereby the longitudinally-disposed portion of the display screen displays a sequence of indicia indicating changes of scene.

16. The method of claim 11 further comprising the step of displaying on the display screen with the displayed arranged slices the full sequence of video frames in a compressed reduced format.

17. In a network system having a central file server, a plurality of computer workstations, the file server and the workstations being connected to communicate with the file server for the purpose of retrieving and processing video images stored on the file server and wherein the level of activity varies with the use of the workstations, a method of increasing the throughput of video images from the file server to a selected workstation, comprising the steps of:

analyzing each of the frames to determine a value for a selected characteristic of each frame;

assigning a characteristic value to each frame dependent on the analysis of the selected characteristic;

comparing the characteristic value of succeeding frames to preceding frames;

establishing a threshold level related to a characteristic value and to the level of activity on the network system such that as activity on the network system increases, the threshold level increases and as the activity on the network decreases, the threshold level decreases;

deleting from the sequence those frames who characteristic value is less than the threshold value;

whereby frames are deleted as a proportional function of the activity on the network system before being displayed at a workstation; and, displaying the compressed video sequence.

\* \* \* \* \*